May 31, 1932.    M. KUNIHOLM    1,861,278

HUB CAP FOR VEHICLE WHEELS

Filed Dec. 3, 1931

Inventor
Martin Kuniholm
By Attorneys

Patented May 31, 1932

1,861,278

UNITED STATES PATENT OFFICE

MARTIN KUNIHOLM, OF GARDNER, MASSACHUSETTS, ASSIGNOR TO KUNIHOLM MANUFACTURING COMPANY, OF GARDNER, MASSACHUSETTS, A CORPORATION OF MASSACHUSETTS

HUB CAP FOR VEHICLE WHEELS

Application filed December 3, 1931. Serial No. 578,732.

This invention relates to the wheels of vehicles and particularly to ornamental hub caps designed for convenient attachment thereto.

It is the general object of my invention to provide an improved construction of hub cap for such purposes, so designed that the cap may be conveniently attached to a wheel and that it will be securely held thereon after such attachment.

Further objects of the invention are to provide an improved construction of hub cap for such purposes, so designed that the cap may be conveniently attached to a wheel and that it will be securely held thereon after such attachment.

Further objects of the invention are to provide hub caps which may be attached to wheels having spokes in different angular relations, and to provide hub caps which will be self-centered on the wheels.

My invention also relates to arrangements and combinations of parts which will be hereinafter described and more particularly pointed out in the appended claims.

A preferred form of the invention is shown in the drawings, in which

Figure 1:
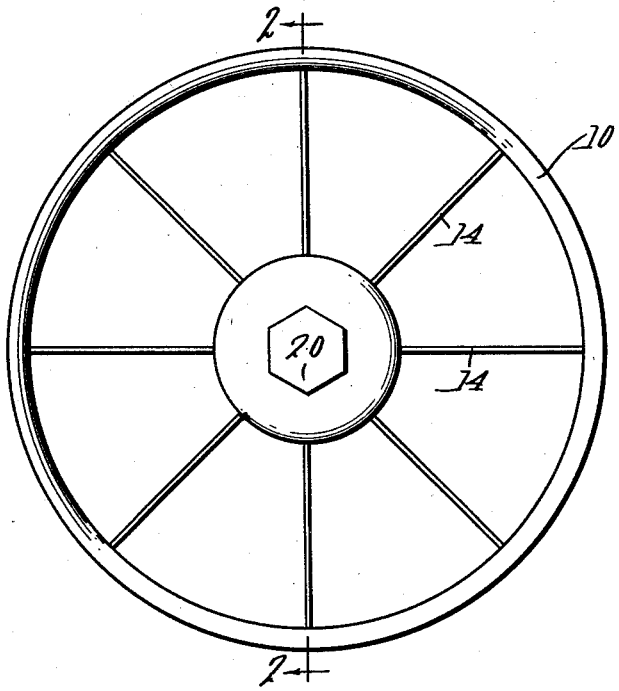
Fig. 1 is a front elevation of a wheel having my improved hub cap mounted thereon.

Referring to the drawings, I have shown my invention applied to a wheel having a rim 10 adapted to receive a solid rubber tire and having a hub 11 provided with end portions or heads 12 and 13, which heads are connected to the rim 10 by a plurality of angularly spaced wire spokes 14.

Figure 2:
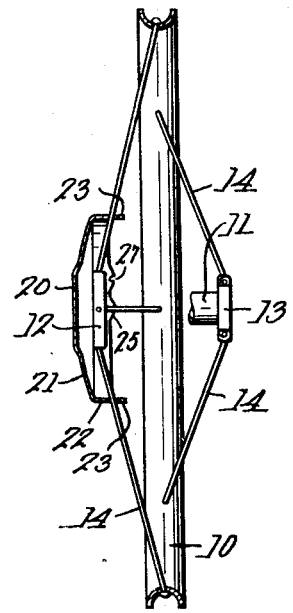
Fig. 2 is a sectional side elevation of the wheel and hub cap, taken along the line 2—2 in Fig. 1.

The wire wheel thus described is of a usual commercial construction and in itself forms no part of my present invention, which relates to the provision of a hub cap 20, so constructed that it may be conveniently attached to the wheel in position to cover the outer hub portion or head 12, as shown in Figs. 1 and 2.

My improved hub cap, in its preferred form, comprises a disc or body portion 21 having a circumferential flange 22 projecting axially rearward from the disc 21. The body portion 21 may be of any desired ornamental configuration.

Ears or lugs 23 are provided on the rear edge of the flange 22, these ears being preferably disposed at opposite ends of a diameter and being each provided with a segmental slot 24 adapted to receive one of the wire spokes 14.

The hub cap 20 is also provided with additional projections 25 on the rear edge of the flange 22, which projections 25 are spaced apart to provide a spoke-receiving notch. In the preferred form, a pair of notches 26 and a second pair of notches 27 are provided, each pair being disposed at opposite ends of a diameter of the hub cap.

The notches 26 are preferably positioned along a diameter at 90° to the diameter joining the slotted ears 23, and the notches 27 are preferably positioned at 60° from the ears 23. The rear edges of the projections 25 are preferably inclined and merge gradually into the rear edge of the flange 22.

Figure 3:
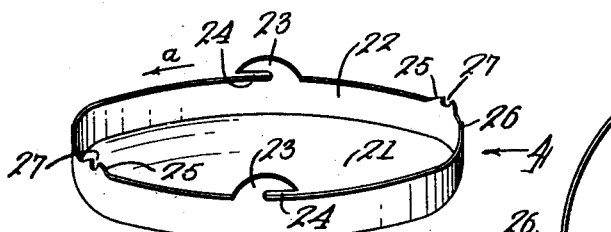
Fig. 3 is a perspective view of the cap.
Figure 4:
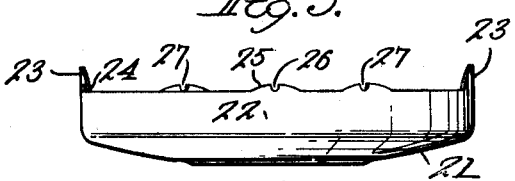
Fig. 4 is a side elevation thereof, looking in the direction of the arrow 4 in Fig. 3.
Figure 5:
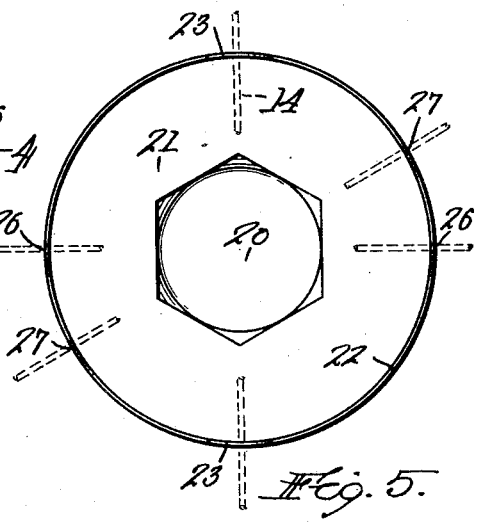
Fig. 5 is an enlarged front elevation of the hub cap.

Having formed a hub cap as above described, the cap is applied to a wheel by hooking the slotted ears 23 under two oppositely disposed spokes 14 and then turning the hub cap in the direction of the arrow $a$ in Fig. 3 until certain intermediate spokes snap into the notches 26 or 27, depending on the number of spokes in the wheel. During this angular movement of the hub cap, the inclined sides of the projections 25 have a cam action on the more or less flexible spokes 14, displacing them sufficiently to permit angular movement of the hub to final position, in which final position the spokes snap into the notches 26 or 27 and firmly resist angular displacement of the hub cap.

Figure 6:
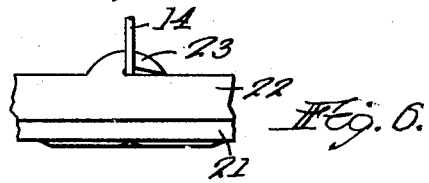
Fig. 6 is a detail side elevation to be described.

If additional security is desired, however, hook-shaped ends of the ears 23 may be bent as indicated in Fig. 6, thus securely locking the hub cap to the spokes 14.

The provision of two sets of notches 26 and 27, at 90° and 60° respectively from the ears 23, adapts my improved hub cap to wheels having 4, 6, 8, 12, 16 or 18 spokes on a side without any change in the construction of the caps or the position of the notches. Obviously if a hub cap is to be used only with a series of wheels having a number of spokes divisible by 4, the notches 27 may be omitted, and if only with wheels having a number of spokes divisible by 6, the notches 26 may be omitted.

A single notch 26 or 27 may be used, but the use of notches in oppositely disposed pairs is more satisfactory.

My improved hub cap is not only readily attached to a wheel by the construction described but is also self-centered on the wheel, as the cap must be accurately centered before the spokes in the wheel can be caused to enter the retaining notches 26 or 27.

My improved hub cap may be made of any desired material such as sheet metal or fibre, and may be given any desired ornamental finish, such as plating and polishing. These hub caps may be easily and economically manufactured and produce a very desirable ornamental application on a wheel when applied thereto.

Having thus described my invention and the advantages thereof, I do not wish to be limited to the details herein disclosed, otherwise than as set forth in the claims, but what I claim is:—

1. A hub cap for vehicle wheels comprising a body portion having diametrically-spaced, circumferentially-slotted attaching ears, and having spoke-receiving notched portions between said slotted ears.

2. A hub cap for vehicle wheels comprising a body portion having diametrically-spaced, circumferentially-slotted attaching ears, and having spoke-receiving notched portions disposed on diameters at 60° and 90° respectively to the diameter connecting said ears.

3. A hub cap for a vehicle wheel having a hub and wire spokes comprising a body portion, a rearwardly projecting circumferential flange substantially spaced radially from the hub when attached to the wheel, means to secure said cap to said wheel, and means to center and retain said cap on said wheel, said latter means coacting directly with selected spokes at points spaced from the hub and being operative with spokes spaced in a plurality of different angular relations.

4. A hub cap for a vehicle wheel having wire spokes comprising a body portion having rearwardly projecting slotted ears and having rearwardly projecting notched members, said notched members being shaped to displace the associated wire spokes with a cam action during the attachment of the cap to the wheel.

5. A hub cap for a vehicle wheel having wire spokes comprising a body portion with a rearwardly extending circumferential flange, a pair of circumferentially slotted ears projecting rearwardly from the edge of said flange and coacting with selected spokes to prevent axial displacement of said cap, and a notched projection on said flange engageable by a spoke of said wheel when said cap is mounted thereon and preventing angular displacement of said cap.

6. A hub cap for a vehicle wheel having wire spokes comprising a body portion with a rearwardly extending circumferential flange, a pair of slotted ears projecting rearwardly from the edge of said flange, and a notched projection on said flange having inclined edge portions at the sides of the notch, said edge portions being effective to displace a wire spoke with a cam action during attachment of the cap to the wheel.

In testimony whereof I have hereunto affixed my signature.

MARTIN KUNIHOLM.